United States Patent

Sauer

Patent Number: 5,706,558
Date of Patent: Jan. 13, 1998

[54] HOSE CLAMP

[75] Inventor: Heinz Sauer, Ronneburg, Germany

[73] Assignee: Rasmussen GmbH, Maintal, Germany

[21] Appl. No.: 731,847

[22] Filed: Oct. 21, 1996

[30] Foreign Application Priority Data

Oct. 19, 1995 [DE] Germany .................. 195 38 819.4

[51] Int. Cl.$^6$ .................................................. B65D 63/00
[52] U.S. Cl. .................. 24/279; 24/20 CW; 24/271; 24/274 R; 285/252
[58] Field of Search .................... 24/279, 271, 274 R, 24/20 CW; 285/252, 253

[56] References Cited

U.S. PATENT DOCUMENTS

| | | | |
|---|---|---|---|
| 1,373,673 | 4/1921 | Ritter | 24/279 |
| 1,805,174 | 5/1931 | Gudka | 285/252 |
| 2,417,741 | 3/1947 | Dillon | 24/279 |
| 2,729,846 | 1/1956 | Reed | 24/20 CW |
| 3,010,172 | 11/1961 | Kaplan | 24/279 |
| 3,396,439 | 8/1968 | Schaub | |
| 4,308,648 | 1/1982 | Fay | 24/279 |
| 4,402,113 | 9/1983 | Smith | 24/279 |
| 4,907,319 | 3/1990 | Calmettes et al. | 24/20 CW |

FOREIGN PATENT DOCUMENTS

| | | | |
|---|---|---|---|
| 0 296 918 | 12/1988 | European Pat. Off. | |
| 2 496 831 | 6/1982 | France | |
| 1 939 414 | 7/1970 | Germany | |
| 32 46 542 | 7/1983 | Germany | |
| 39 41 135 | 1/1991 | Germany | |
| 40 05 631 | 9/1991 | Germany | |
| 41 27 017 | 4/1992 | Germany | |
| 4188529 | 9/1992 | Germany | 24/279 |
| 583719 | 12/1946 | United Kingdom | |
| 0954388 | 4/1964 | United Kingdom | 24/271 |
| 1138064 | 12/1968 | United Kingdom | |
| 2 112 444 | 7/1983 | United Kingdom | |

*Primary Examiner*—Victor N. Sakran
*Attorney, Agent, or Firm*—Darby Darby

[57] ABSTRACT

A hose clamp having an elastically flexible clamp band, which is made of metal. A clamping head joins the ends of the clamp band. The clamp band has a slit that extends in the circumferential direction. The slit divides the band into a first edge section and a second edge section. One of the two edge sections includes a spring device (e.g., a corrugation), which creates a spring force in the circumferential direction of the hose clamp over an entire operating temperature range. Thus, the hose clamp sealingly locks a hose in place on a pipe, regardless of any thermally caused expansion or contraction of the hose material.

13 Claims, 3 Drawing Sheets

HOSE CLAMP

BACKGROUND OF THE INVENTION

1. Field of the Invention

The present invention relates to a hose clamp having an elastically flexible clamp band that is made of metal, and a clamping head that joins the ends of the clamp band.

2. Discussion of the Related Art

The material that hoses are made of, in particular plastic, tends to expand when heated and contract considerably when cooled, especially at temperatures below 0° C. When a hose of this type is locked in place on a pipe or the like by means of an inelastic conventional hose clamp, for example, a conventional worm-drive clamp, the hose clamp will loosen on the hose when the hose contracts when intensely cooled (e.g., when at temperatures below 0° C). In some cases, the connection between the hose and the pipe will no longer be maintained, thereby resulting in a leak. To account for this problem, hose clamps have been developed as shown, for example, by German References DE 39 41 135 C1, DE 40 05 631 C2, or DE 41 27 017 C1, in which a separately mounted spring is placed under preload when the hose clamp is tensioned and, therefore, as the temperature drops and the hose contracts, the hose clamp continues to lock the hose in place elastically on the pipe. While a hose clamp of this type locks the hose in place at low temperatures with better sealing effectiveness than an inelastic hose clamp, its clamping force at higher temperatures is less than that of an inelastic hose clamp.

Accordingly, it is an object of the present invention to provide a hose clamp that ensures a higher clamping force and, therefore, a more tightly sealed connection between a hose and a pipe over a greater temperature range (e.g., at temperatures both below the freezing point and above the freezing point).

SUMMARY OF THE INVENTION

This object is achieved, according to the present invention, with a clamp band that has a slit extending in the circumferential direction. The slit divides the band into a first edge section and a second edge section. Only one of the two edge sections has a spring device, which creates a spring force in the circumferential direction of the hose clamp over the entire operating temperature range.

The non-resilient edge section (i.e., the edge section that does not include the spring device) substantially determines the clamping force of the hose clamp at higher temperatures because this edge section does not expand with increasing temperatures to the same extent as the hose. The resilient edge section contracts at lower temperatures, especially temperatures below 0° C., so that the hose clamp maintains a clamping force on the hose despite the fact that the non-resilient edge section has become ineffective.

The spring device is, in a preferred embodiment, a corrugation of one of the edge sections. Thus, separate springs are not required in this preferred embodiment.

The corrugation can be formed by deep drawing after the slit has been punched out. Therefore, the undulation can be formed with the necessary spring preload, while not requiring a change in the length of the uncorrugated edge section. The slit preferably extends over at least a quarter of the circumference of the tightened hose clamp so that there is sufficient material to form the corrugation, yet the hose clamp is sufficiently flexible over a relatively large circumferential area on its one circumferential edge.

In an alternative embodiment, it is possible for the edge sections to be formed separately, and, thereafter, the ends of the edge section overlap and are joined to one another. The corrugation can be formed by bending the one edge section. Thus, the requisite spring preload can be formed in the corrugation, without elongating the material of the corrugation.

The corrugation is preferably covered on the inside (i.e., on a radially inwardly facing surface) of the clamp band by an underliner. The underliner is fastened to the clamp band so that relative movement between the corrugation and the underliner is possible. Thus, the corrugation can expand or contract without its movement being impeded by the hose.

In addition, the underliner bridges a circumferential gap between the ends of the clamp band to prevent the hose material from penetrating into this gap.

The underliner is comprised of one or two strips. Alternatively, the underliner can have an approximate U-shape. One of the two strips, or the single strip or the one leg of the U-shaped underliner covers the underside (i.e., the radially inwardly facing surface) of the corrugation. The other of the two strips or leg of the U-shaped liner contacts against the underside of the uncorrugated edge section. The two strips or the legs of the single strip have flanges that are bent radially outwardly and contact against the edges of the respective edge section. The flanges guide the movement of the edge sections in the circumferential direction of the hose clamp.

The slit is preferably bridged at each of its ends by a band-shaped arch. The arch has an approximate inverted U-shape, which protrudes radially outwardly from the clamp band. The arch constitutes a clamping jaw. A clamping screw extends through both arches. Clamping jaws, when formed in this manner, withstand high clamping forces without deflecting in the circumferential direction. The arches do not need to be separately manufactured and joined to the clamp band.

The arches have yokes that extend in the axial direction of the hose clamp. A bracket is bent radially inwardly at an edge of the yoke that is disposed opposite to the other yoke. The bracket that is located on the side of the clamping screw head has a hole for passage of the clamping screw shaft. The bracket that is disposed on the opposite side of the clamping screw head has a threaded hole into which the clamping screw shaft engages. Each of the yokes has edges that extend in a circumferential direction. An arch limb is bent radially inwardly at each circumferentially extending edges. Each bracket contacts against the adjacent edges of the respective arch limb. When the clamping screw is tightened, this structural arrangement advantageously prevents the clamping screw head from being pulled into the one arch, and the clamping screw shaft from being pulled into the other arch.

The threaded hole can be formed in a drawn rim in the bracket of the arch so that extra parts, such as, additional nuts for receiving the clamping screw shaft are not required. Additionally, because of this structure, the bracket contacts against the adjacent arch limbs.

If the brackets have tabs that are bent over laterally onto adjacent arch limbs, there is an increased resistance of the brackets to being pulled into the arches when the clamping screw is tightened. Simultaneously, the arch limbs are axially held together and the twisting of the bracket is prevented.

In an alternative embodiment, the hose clamp can be a worm-drive clamp.

DETAILED DESCRIPTION OF THE PRESENTLY PREFERRED EXEMPLARY EMBODIMENT

Figure 1:
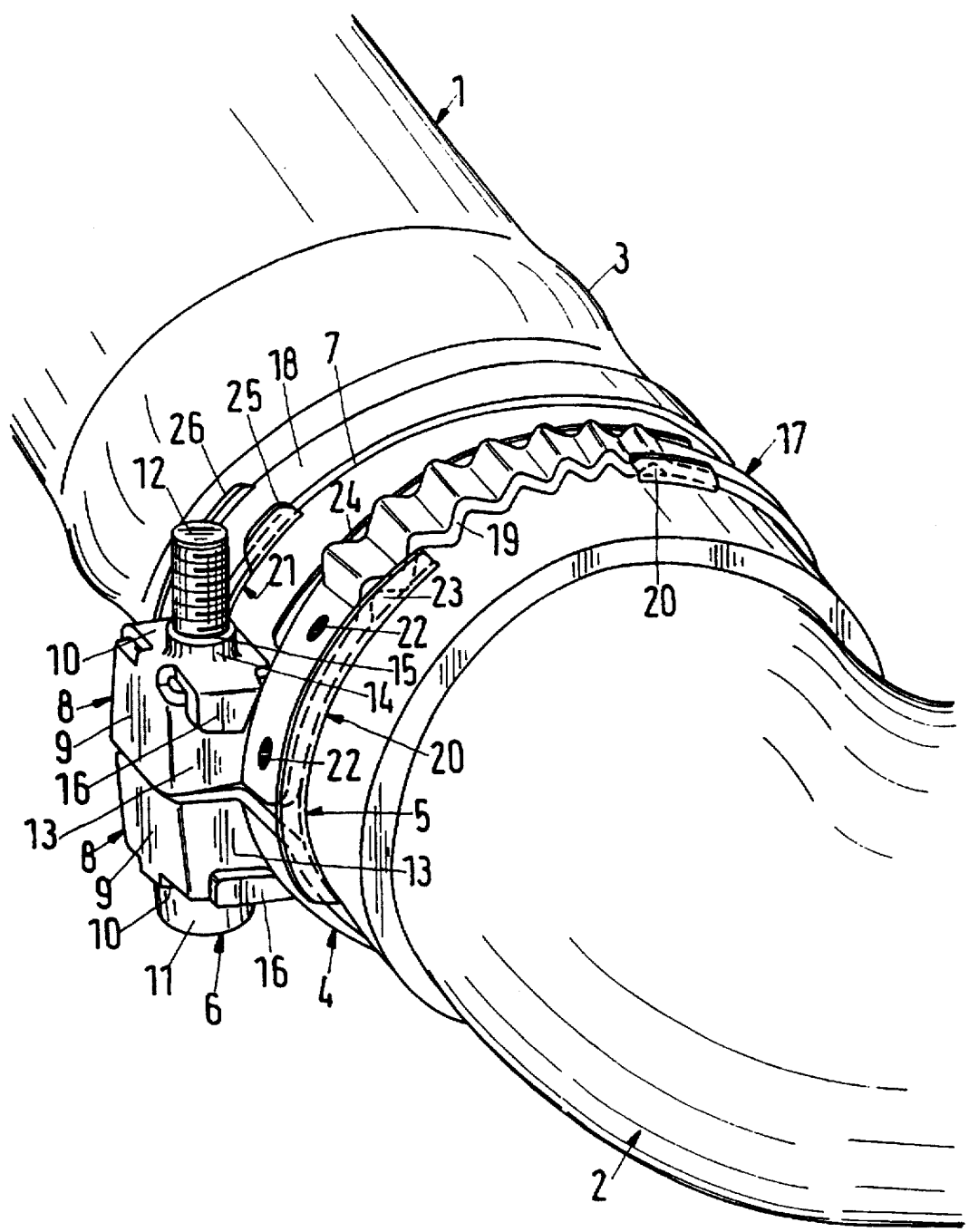
FIG. 1 is a perspective view of a first embodiment of a hose clamp placed around an end section of a hose that is slid onto an end section of a pipe according to the present invention.

Referring now to FIG. 1, a hose clamp is illustrated. The hose clamp secures an end section of a hose 1, which is made of plastic, onto an end section of a curved pipe 2. The end section of pipe 2 has a circumferential retaining rib. Pipe 2, may be, for example, a pipe connector. The retaining rib pushes the hose material radially outwardly to thereby form a ridge 3.

The hose clamp is comprised of an elastically flexible clamp band 4, an underliner 5 and a clamping screw 6. Clamp band 4 is preferably made of stainless or hardened spring steel that has a corrosion-resistant coating. Underliner 5 bridges the circumferential gap between the ends of hose clamp 4.

Clamp band 4 has a slit 7 that extends in the circumferential direction of the hose clamp. As illustrated in FIG. 1, slit 7 extends about the entire circumference of the hose clamp. Slit 7 is bridged at each of its ends by a band-shaped arch 8. Arches 8 are pushed radially outwardly from clamp band 4. Thus, arches 8 are shaped approximately like an inverted U and constitute a clamping jaw. Clamping screw 6 passes through both arches 8. Each arch 8 has a yoke 9 that extends in the axial direction of the hose clamp. Brackets 10 are bent radially inward at the edges of the yokes 9 that are disposed opposite each other (i.e., the edges that face away from each other). Bracket 10, which is located on the side of clamping screw head 11, has a hole (not visible in FIG. 1) to permit the passage of clamping screw shaft 12 through the arch. Each bracket 10 is in contact with the adjacent edges of the respective two adjacent arch limbs 13. Bracket 10, which is located on the side opposite clamping screw head 11, has an internally threaded hole 15 to receive and support the threads of screw shaft 12. The threads are configured in the drawn rim 14 of hole 15 in bracket 10 of the adjacent arch 8. Alternatively, bracket 10 could support a nut. Brackets 10 also have tabs 16 bent over laterally onto the adjacent arch limbs 13.

The hose clamp according to the present invention has the advantage that the clamping jaws, which are constituted by arches 8, withstand high clamping forces because of their wide band shape in the circumferential direction. Additionally, arches 8 do not need to be configured separately from clamp band 4 and then joined to it, for example, by spot welding. Similarly, separate parts, such as, for example, nuts or washers are not necessary to support clamping screw 6. To manufacture clamp band 4, first a strip- or band-shaped plate is punched out of a metal sheet. Substantially simultaneously, slit 7 is lanced out of the punched out sheet. When slit 7 is lanced, the material for brackets 10 and tabs 16 remains (i.e., this material is not punched out). Thus, correspondingly less waste of material occurs when slit 7 is lanced out. The contact of brackets 10 against the adjacent edges of arch limb 13 ensures that not only brackets 10, but also clamping screw head 11, are not pulled into arches 8 when clamping screw 6 is tightened. Tabs 16, which are bent over laterally onto the adjacent arch limbs 13, also help ensure that when clamping screw 6 is tightened, neither brackets 10 nor clamping screw head 11 penetrate into the respective arch 8. Additionally, when screw 6 is tightened, brackets 10 do not twist, and arches 8 do not expand away from hose 1 and pipe 2 due to axial forces.

Slit 7 is laterally delimited (i.e., defined) by each of two edge sections 17, 18 of clamp band 4. One edge section 17 includes a spring device, preferably in the form of a corrugation 19, which causes a spring force to be applied over the entire operating temperature range of the hose clamp. Corrugation 19 is preferably formed by deep drawing during the shaping of clamp band 4.

Underliner 5 is comprised of two separate strips 20 and 21. Each strip 20, 21 extends in the circumferential direction, and is in contact with the underside (i.e., the radially inwardly facing circumferential surface) of edge sections 17 and 18. Each strip 20, 21 is joined to one end of the edge sections 17, 18, respectively by spot welds 22. Each strip 20, 21 bridges the circumferential gap between arches 8 on either side of limbs 13. Alternatively, strips 20, 21 can be constituted by the legs of a U-shaped plate which bridges the gap between the arches. In another alternative embodiment, strip 21 can be omitted and underliner 5 can be comprised of only strip 20.

Strip 20, which, for the sake of clarity in the drawings, is illustrated as being partially interrupted, covers the underside of corrugation 19. Both strips 20, 21 have flanges 23, 24 and 25, 26, respectively. Flanges 23–26 are bent radially outwardly and are each in contact against the respective edges of edge sections 17, 18. If only the axial gap between the ends of each of the edge sections 17, 18 is to be bridged, to prevent hose material from emerging and being caught in this area, it is sufficient to have the ends of each edge section 17 or 18 overlap one another, such that one end of each edge section 17, 18 that is located on the side of the one arch 8 extends beyond the axial gap. These extensions of the edge section 17 or 18 can additionally be widened in the axial direction up to the respective opposite edge of slit 7. In this widened region, edge sections 17, 18 can overlap one another and can optionally be joined to one another, for example, by spot welding. When the pipe diameter is so large that a relatively large circumferential gap exists between the clamping jaws 8, the overlapping of the end sections 17, 18, which stiffens the extension, prevents the extension, which bridges the circumferential gap between the clamping jaws 8, from radially bulging outwardly into the gap when clamping jaws 8 are drawn together.

After the hose clamp has been clamped by tightening clamping screw 6, edge section 18 exerts the requisite clamping force on hose 1 substantially in an operating temperature range that lies above approximately 0° C. Edge section 18 applies a requisite clamping force because the hose material expands with rising temperature, while edge section 18 also expands, but not to the same extent. Corrugation 19, which is under spring preload over the entire temperature range, also exerts a clamping force on hose 1 at higher temperatures, but not to the same extent as edge section 18. But as the operating temperature drops, in particular when the temperature falls below the freezing point, the hose material contracts such that edge section 18 ultimately exerts no clamping force on hose 1. Edge section 17, however, because of resilient corrugation 19, continues to contract, so that even at low temperatures, such as, for example, down to approximately −40° C., a clamping force is still exerted on hose 1, and adequate sealing between hose 1 and pipe 2 is ensured.

Underliner 5 prevents the hose material from penetrating into the gap between the ends of edge sections 17 and 18, but also, by means of strip 20, prevents the hose material from penetrating into corrugation 19 and thereby impeding the contraction of corrugation 19. At the same time, flanges 23–26 guide the movement of edge sections 17 and 18.

Figure 2:
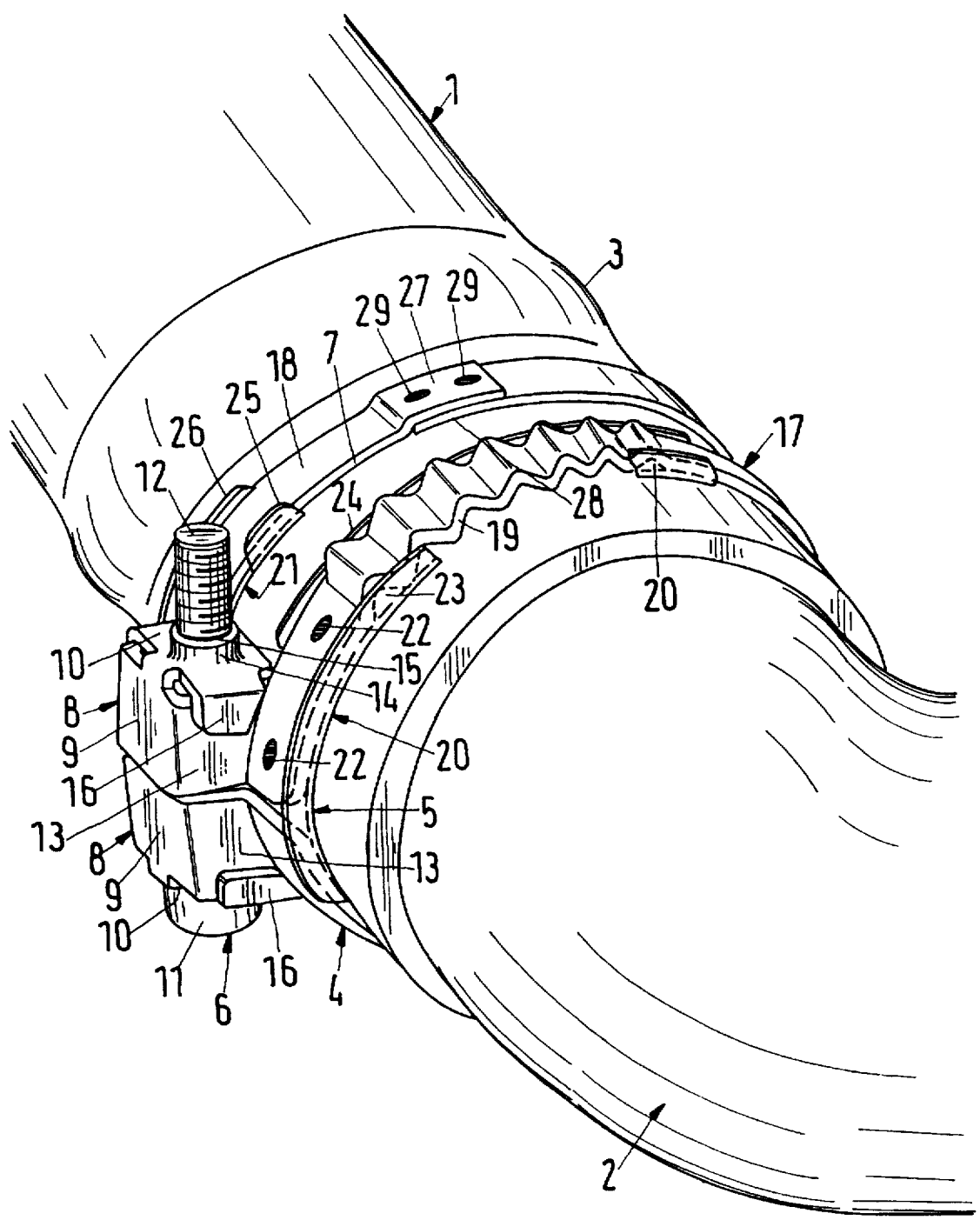
FIG. 2 is a perspective view of a slight modification of the hose clamp shown in FIG. 1.

The hose clamp according to FIG. 2 differs from that of FIG. 1 only in that edge section 18 is axially separate with respect to edge section 17. Additionally, the ends 27, 28 of edge section 18 overlap one another, and are joined together by spot welds 29. Because edge section 18 is thus shortened in the circumferential direction, the stretching of the material of corrugation 19 can be made by bending edge section 17.

Figure 3:
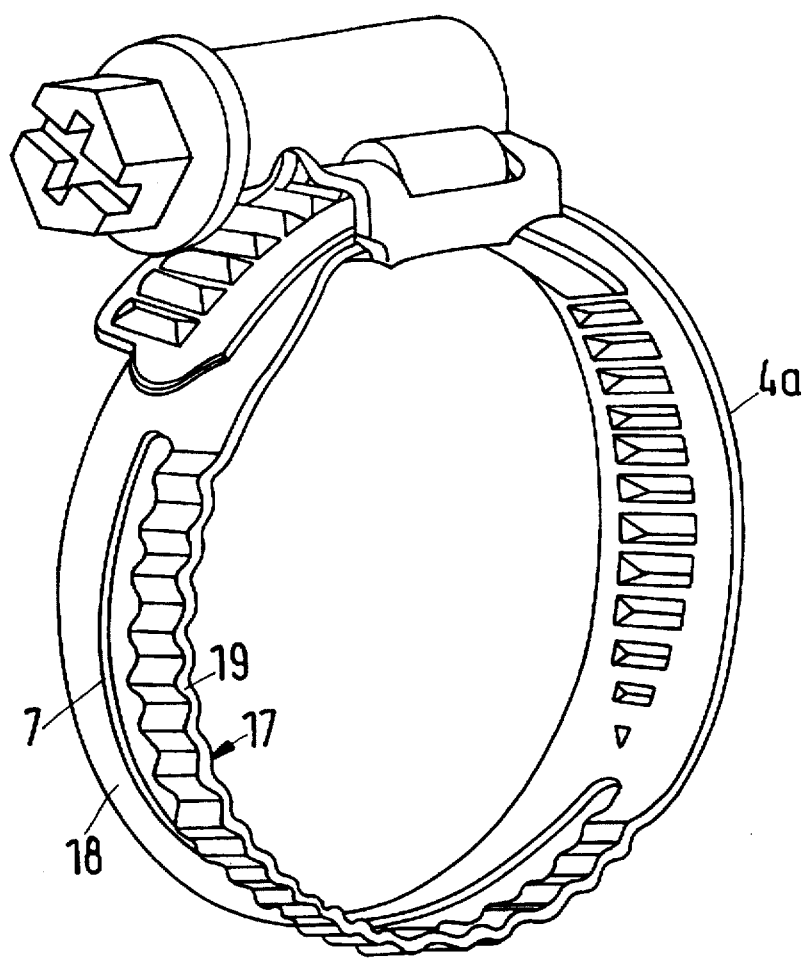
FIG. 3 is a perspective view of another embodiment of a hose clamp according to the present invention.

The hose clamp according to FIG. 3 is substantially a conventional worm-drive hose clamp, in which clamp band 4a also has a slit 7 extending in the circumferential direction of the hose clamp. Only one edge section 17 of the two edge sections 17, 18 of clamp band 4a, which laterally delimit slit 7, is corrugated. The use of corrugation 17 causes clamp band 4a to apply a spring force in the circumferential direction of the hose clamp over the entire operating temperature range. While slit 7 extends over the entire circumference of the hose clamp in the hose clamp of FIG. 1, slit 7 extends only over approximately half the circumference in the embodiment illustrated in FIG. 3. Slit 7 preferably extends over at least a quarter of the circumference of the tightened hose clamp.

An underliner, which corresponds to underliner 5 of FIG. 1, can also be used with the hose clamp of FIG. 3.

The hose clamps according to FIGS. 2 and 3 operate in fundamentally the same way as the hose clamp according to FIG. 1.

Corrugation 19, which is illustrated as being made up of multiple bends, can also be made with only one bend or with a half-bend (e.g., an approximately omega-shaped bend). Alternatively, instead of corrugation 19 being integrated into edge section 17, a separate spring can be used, which spring joins the ends of an interruption in the edge section 17. Additionally, a convex or corrugated leaf spring or the like can be mounted on the inside of edge section 17, which would then be uncorrugated and uninterrupted. Thus, it is possible to provide a combination of springs instead of corrugation 19 or in addition to corrugation 19.

Having described the presently preferred exemplary embodiment of a hose clamp in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A hose clamp comprising:
   an elastically flexible band, said band having a first end and a second end, said band having a slit extending in a circumferential direction, said slit dividing said band into a first edge section and a second edge section, only one of said edge sections having a spring device which creates a spring force in the circumferential direction of said hose clamp over an entire operating temperature range; and
   a clamping head joining said ends of said band.

2. The hose clamp according to claim 1, wherein said spring device is a corrugation of said one edge section.

3. The hose clamp according to claim 2, wherein said corrugation is formed by deep drawing.

4. The hose clamp according to claim 2, wherein the other one of said edge sections is spaced from said one edge section, a first end and a second end of said other end section overlap with respect to one another, said overlapping ends being joined together; said corrugation being formed by bending said one edge section.

5. The hose clamp according to claim 4, further comprising an underliner being fastened to a radially inwardly facing surface of said band to permit a relative movement between said corrugation and said underliner.

6. The hose clamp according to claim 5, wherein said underliner bridges a circumferential gap between said ends of said band.

7. The hose clamp according to claim 5, wherein said underliner is comprised of at least two strips, one of said at least two strips covers a radially inwardly facing surface of said corrugation, the other one of said at least two strips contacts against a radially inwardly facing surface of said other one of said edge sections, said at least two strips have radially outwardly bent flanges which contact against the edges of the respective edge sections.

8. The hose clamp according to claim 7, further comprising a first band shaped arch bridging said slit at said first end of said band, and a second band shaped arch bridging said slit at said second end of said band, each of said arches having an approximately inverted U-shape and protruding radially outwardly with respect to said band; a clamping screw extending through each of said arches.

9. The hose clamp according to claim 8, wherein said arches each have a yoke extending in an axial direction of said hose clamp, a bracket being bent radially inwardly at an edge of said yoke that is disposed opposite to said other yoke, the bracket that is disposed on the side of the clamping screw head having a hole for passage of the clamping screw shaft, each of said yokes have edges that extend in a circumferential direction, an arch limb being bent radially inwardly at each circumferentially extending edge, each bracket contacting against the adjacent edges of the respective arch limb, the bracket that is disposed on the opposite side of the clamping screw head having a threaded hole to support threads into which the clamping screw shaft engages.

10. The hose clamp according to claim 9, wherein said threaded hole is in a drawn rim of the bracket that is disposed on the opposite side of the clamping screw head.

11. The hose clamp according to claim 9, wherein said brackets have tabs that are bent over laterally onto adjacent arch limbs.

12. The hose clamp according to claim 1, further comprising a worm drive being connected to said band to selectively expand and contract said band.

13. The hose clamp according to claim 1, wherein said slit extends over at least a quarter of the circumference of the tightened hose clamp.

* * * * *